(12) United States Patent
Li

(10) Patent No.: US 12,542,985 B2
(45) Date of Patent: Feb. 3, 2026

(54) CONFIGURATION METHOD, DATA TRANSMISSION METHOD, CONTROLLER, OPTICAL LINE TERMINAL, AND MEDIUM

(71) Applicant: ZTE CORPORATION, Guangdong (CN)

(72) Inventor: Yufeng Li, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 213 days.

(21) Appl. No.: 18/034,613

(22) PCT Filed: Nov. 10, 2021

(86) PCT No.: PCT/CN2021/129688
§ 371 (c)(1),
(2) Date: Apr. 28, 2023

(87) PCT Pub. No.: WO2022/100593
PCT Pub. Date: May 19, 2022

(65) Prior Publication Data
US 2023/0403487 A1     Dec. 14, 2023

(30) Foreign Application Priority Data
Nov. 11, 2020  (CN) .......................... 202011255015.4

(51) Int. Cl.
*H04Q 11/00*     (2006.01)
*H04L 12/46*     (2006.01)

(52) U.S. Cl.
CPC ..... *H04Q 11/0067* (2013.01); *H04L 12/4645* (2013.01); *H04Q 2011/0086* (2013.01)

(58) Field of Classification Search
CPC ................................................ H04Q 11/0067
See application file for complete search history.

(56) References Cited

U.S. PATENT DOCUMENTS

2010/0142944 A1   6/2010  Zou
2021/0184893 A1*  6/2021  Cheng ................... H04L 67/34
2022/0239374 A1*  7/2022  Su ........................ H04Q 11/00

FOREIGN PATENT DOCUMENTS

CN     101005445 A     7/2007
CN     101414941 A     4/2009
(Continued)

OTHER PUBLICATIONS

Huang et al., "5G-Oriented Optical Underlay Network Slicing Technology and Challenges", IEEE Communication Magazine, Feb. 2020 (Year: 2020).*
(Continued)

*Primary Examiner* — Shi K Li
(74) *Attorney, Agent, or Firm* — Li & Cai Intellectual Property (USA) Office

(57) ABSTRACT

The present disclosure provides a configuration method, including: determining, according to OAN service types, information of at least one OAN slice for transmitting an OAN service flow of each OAN service type; determining, according to OTN service types, information of at least one OTN slice for transmitting an OTN service flow of each OTN service type; and establishing, according to a correspondence relationship of the OAN service types and the OTN service types, a mapping relationship between the at least one OAN slice and the at least one OTN slice to obtain information of at least one end-to-end slice, where each end-to-end slice includes a set of OAN slice and OTN slice having a mapping relationship. The present disclosure further provides a data transmission method, a controller, an optical line terminal, and a computer-readable storage medium.

8 Claims, 12 Drawing Sheets

(56) References Cited

FOREIGN PATENT DOCUMENTS

| | | | | | |
|---|---|---|---|---|---|
| CN | 107295609 | A | 10/2017 | | |
| CN | 108737912 | A | 11/2018 | | |
| CN | 108989177 | A | 12/2018 | | |
| EP | 2348691 | B1 * | 2/2015 | ......... | H04L 12/4633 |
| EP | 3614626 | A1 | 2/2020 | | |
| KR | 20050024089 | A | 3/2005 | | |
| WO | WO2018214423 | A1 | 11/2018 | | |

OTHER PUBLICATIONS

European Patent Office, extended European Search Report dated Apr. 30, 2024, for corresponding EP application No. 21891113.9.
Wang Wei et al.:"Network Service Slicing Supporting Ubiquitous Access in Passive Optical Networks". 2018 20th International conference on transparent optical network IEEE, Jul. 1, 2018.
WIPO, International Search Report issued on Jan. 27, 2022.
China Patent Office, the first Office acction dated Jun. 28, 2025, for corresponding CN application No. 202011255015.4.

* cited by examiner

| Service flow | End-to-end slice | OAN slice | PON uplink slot identifies slice information with T-CONT | ONU uplink GEMPORT map |
|---|---|---|---|---|
| FLOW IDx | Slice x | Slice x' | T-CONTx (Alloc ID) | Slice information map: ONUx GEMPORT {X—Y} |

FIG. 24

| Service flow | End-to-end slice | OAN slice | PON downlink slot identifies slice information with GEMPORT |
|---|---|---|---|
| FLOW IDx | Slice x | Slice x' | XGEMPORT[X-Y] |

FIG. 25

CONFIGURATION METHOD, DATA TRANSMISSION METHOD, CONTROLLER, OPTICAL LINE TERMINAL, AND MEDIUM

CROSS-REFERENCE TO RELATED APPLICATIONS

The present disclosure is a National Phase Application filed under 35 U.S.C. 371 as a national stage of PCT/CN2021/129688, filed on Nov. 10, 2021, an application claiming the priority to Chinese Patent Application No. CN202011255015.4 filed on Nov. 11, 2020, the entire contents of which are incorporated herein by reference.

TECHNICAL FIELD

The present disclosure relates to the field of communication technology, and in particular relates to a configuration method, a data transmission method, a controller, an optical line terminal, and a computer-readable storage medium.

BACKGROUND

The traditional gigabit-capable passive optical network (GPON) and Ethernet passive optical network (EPON) are currently evolving towards 10G-PON technologies, and evolution of the next-generation passive optical network (PON) technologies includes development directions such as NG-PON2, N*25G EPON, single-wavelength 50G PON, and so on. Current mainstream optical line terminal (OLT) devices can support a 100G optical interface for intercommunication with an upstream bearer or transmission device.

Fiber to the X (FTTX) has the characteristics of saving optical fibers and investment of operators. In a network environment where wireless and FTTX of home broadband service coexist, the existing fiber resources for fiber to the home (FTTH) are fully capable of supporting 5G coverage construction.

However, there is still a lack of an all-optical network capable of supporting slicing from an optical access network (OAN) to an optical transmission network (OTN).

SUMMARY

Embodiments of the present disclosure provide a configuration method, a data transmission method, a controller, an OLT, and a computer-readable storage medium.

An embodiment of the present disclosure provides a configuration method, including: determining, according to OAN service types, information of at least one OAN slice for transmitting an OAN service flow of each OAN service type; determining, according to OTN service types, information of at least one OTN slice for transmitting an OTN service flow of each OTN service type; and establishing, according to a correspondence relationship of the OAN service types and the OTN service types, a mapping relationship between the at least one OAN slice and the at least one OTN slice to obtain information of at least one end-to-end slice, where each of the at least one end-to-end slice includes a set of OAN slice and OTN slice having a mapping relationship.

An embodiment of the present disclosure provides a data transmission method, including: relaying, according to a mapping relationship between an OAN slice and an OTN slice, an OAN service flow transmitted in the OAN slice to the OTN slice for transmission; or relaying, according to the mapping relationship between the OAN slice and the OTN slice, an OTN service flow transmitted in the OTN slice to the OAN slice for transmission.

An embodiment of the present disclosure provides a controller, including: one or more processors; and a storage device having one or more programs stored thereon which, when executed by the one or more processors, cause the one or more processors to implement the configuration method according to the present disclosure.

An embodiment of the present disclosure provides an OLT, including: one or more processors; and a storage device having one or more programs stored thereon which, when executed by the one or more processors, cause the one or more processors to implement the data transmission method according to the present disclosure.

An embodiment of the present disclosure provides a computer-readable storage medium storing a computer program thereon which, when executed by a processor, causes the processor to implement at least one of: the configuration method according to the present disclosure; or the data transmission method according to the present disclosure.

BRIEF DESCRIPTION OF DRAWINGS

FIG. 24 is a schematic mapping diagram of an OAN slice in an uplink direction according to the present disclosure; and FIG. 25 is a schematic mapping diagram of an OAN slice in a downlink direction according to the present disclosure.

DETAIL DESCRIPTION OF EMBODIMENTS

Figure 1:
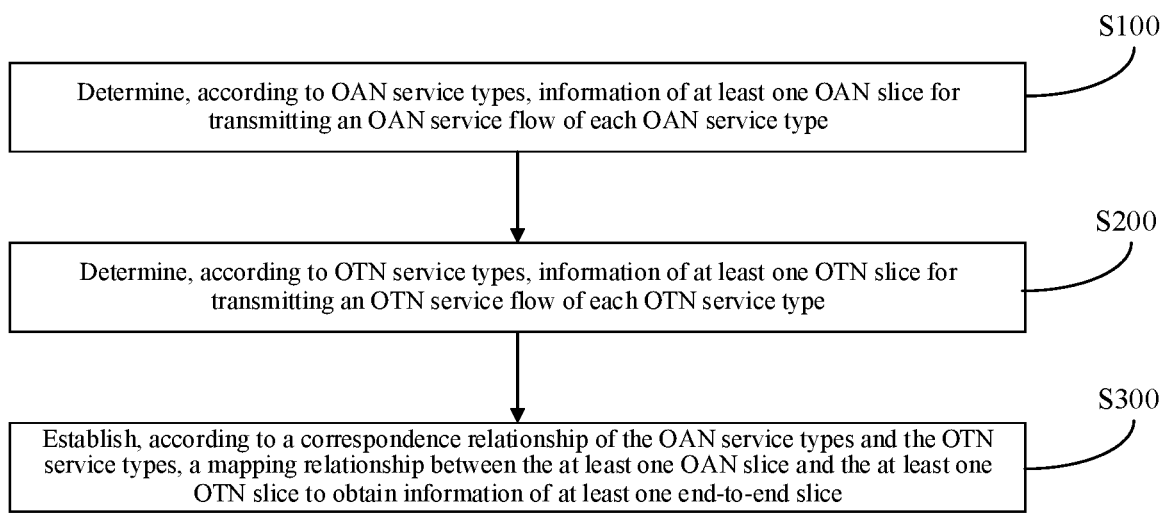
FIG. 1 is a flowchart of a configuration method according to the present disclosure.

In order to make those skilled in the art better understand the technical solutions of the present disclosure, the following describes the configuration method, the data transmission method, the controller, the OLT, and the computer-readable storage medium of the present disclosure in detail with reference to the accompanying drawings.

Example embodiments will be described more sufficiently below with reference to the accompanying drawings, but which may be embodied in different forms and should not be construed as limited to the embodiments set forth herein. These embodiments are provided so that the present disclosure will be thorough and complete, and will fully convey the scope the present disclosure to those skilled in the art.

Embodiments of the present disclosure and features thereof may be combined with each other without conflict.

As used herein, the term "and/or" includes any and all combinations of one or more of the associated listed items.

The terminology used herein is for the purpose of describing specific embodiments only and is not intended to limit the present disclosure. As used herein, the singular forms "a", "an" and "the" are intended to include the plural forms as well, unless the context clearly indicates otherwise. It will be further understood that as used herein, the terms "comprise" and/or "consist of . . . " specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the existing art and the present disclosure, and will not be interpreted in an idealized or overly formal sense unless expressly so defined herein.

The inventor of the present disclosure has found in research that most of the existing OAN devices for access networks have supported the slicing technology. OAN slicing may support slice configuration based on physical ports, logical ports (e.g., two-layer, three-layer tunnels), service flows, or the like, and can be used for different application scenarios and purposes, and an OLT device may identify different slices by slice IDs. In addition, most transmission devices, such as OTN and Flex Ethernet (FlexE), have also supported the slicing technology, and besides slice configuration based on physical ports, logical ports and service flows, most transmission devices further support slot-level slicing based on an OTN optical data unit (ODU) k granularity, an ODUj granularity, an ODUflex granularity or division of FlexE channels in the FlexE.

Currently, an OAN slice domain and a transmission network slice domain manage their respective jurisdictions, and smooth end-to-end slice configuration from the OAN to the transmission network device is still blank. Supporting slicing in an all-optical network to implement unified identification, management and configuration of end-to-end slices is a main problem for operation and maintenance of the whole network while ensuring quality of end-to-end services. Only after this problem is solved, the advantages of the all-optical network can be brought into play, thereby satisfying the requirements of 5G ultra reliable low latency communication (uRLLC) services, ultra-low latency services, high reliability service bearing and high-quality value-added services (such as augmented reality (AR), virtual reality (VR) and 4K/8K television).

In view of this, referring to FIG. 1, the present disclosure provides a configuration method including the following operations S100 to S300.

At operation S100, determining, according to OAN service types, information of at least one OAN slice for transmitting an OAN service flow of each OAN service type.

At operation S200, determining, according to OTN service types, information of at least one OTN slice for transmitting an OTN service flow of each OTN service type.

At operation S300, establishing, according to a correspondence relationship of the OAN service types and the OTN service types, a mapping relationship between the at least one OAN slice and the at least one OTN slice to obtain information of at least one end-to-end slice, where each of the at least one end-to-end slice includes a set of OAN slice and OTN slice having a mapping relationship.

Figure 2:
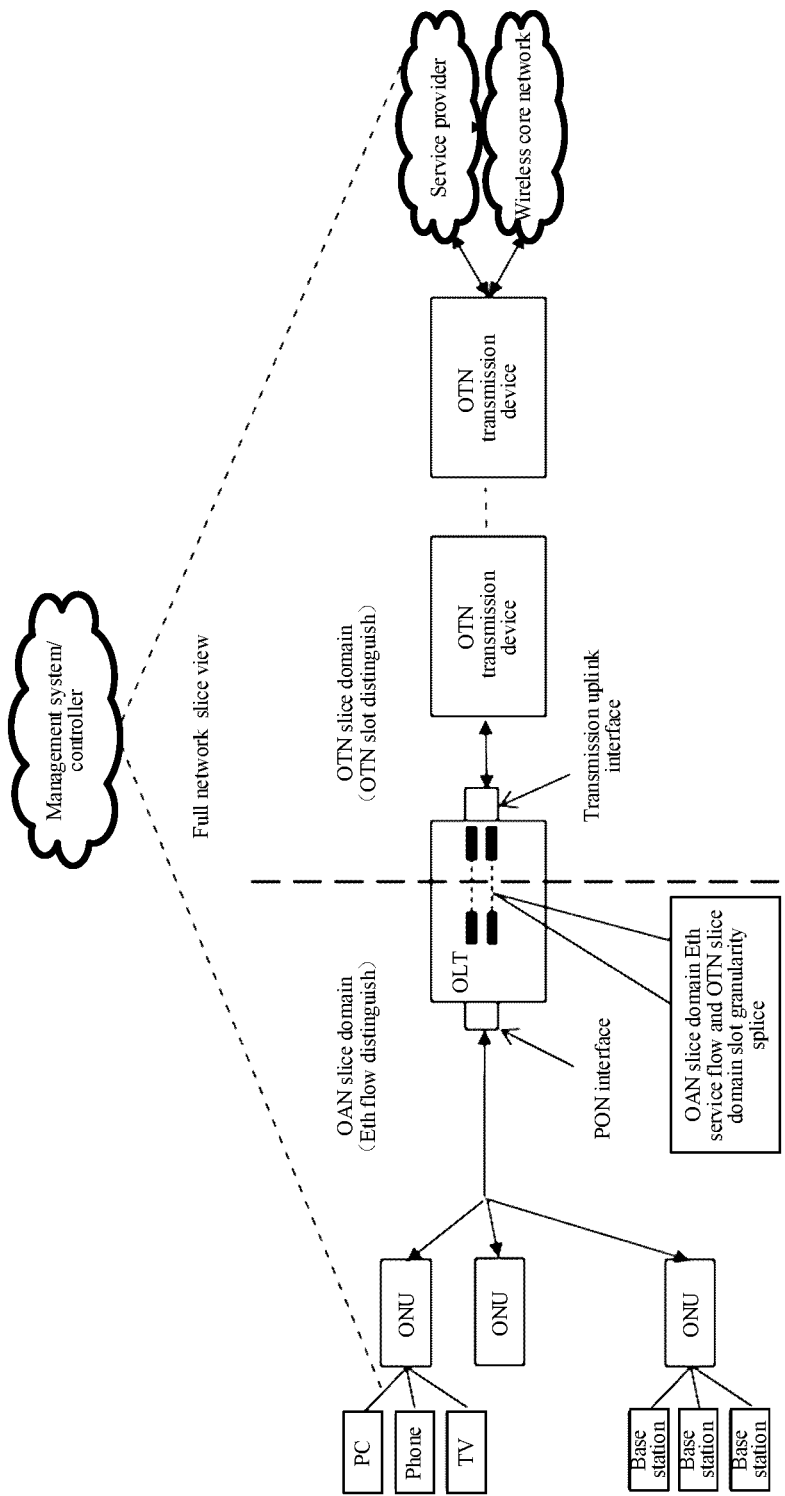
FIG. 2 is a schematic diagram showing end-to-end slicing from an OAN device to an OTN device according to the present disclosure.

As shown in FIG. 2, in the present disclosure, the management system or controller has a full network service view, and is capable of managing and configuring information of an OAN slice domain and an OTN slice domain. The OAN slice domain has a functional range from an optical network unit (ONU) device to an uplink interface of an OLT device; and the OTN slice domain has a functional range from the uplink interface of an OLT device to an egress of the whole OTN.

In the present disclosure, the fact that "each end-to-end slice includes a set of OAN slice and OTN slice having a mapping relationship" meant that in each end-to-end slice, each OTN slice corresponds to at least one OAN slice. In the present disclosure, the OAN service types and the OTN service types may be in one-to-one correspondence, and OAN slices divided according to the OAN service types and OTN slices divided according to the OTN service types are in a 1:1 mapping relationship. In addition, the OAN service types may be further refined in the OAN according to the management requirements, so that a plurality of OAN service types correspond to one OTN service type after being summarized, and the OAN slices divided according to the OAN service types and the OTN slices divided according to the OTN service types are in an N:1 mapping relationship (N is an integer greater than 1). This is not particularly limited in the present disclosure.

In the present disclosure, a mapping relationship between the OAN slice and the OTN slice is established according to a correspondence relationship of the OAN service types and the OTN service types, and the OAN slice domain and the OTN slice domain is spliced to establish an end-to-end slice corresponding to each mapping relationship. The term "end-to-end slice" refers to a slice from the OAN device to OTN device. In the present disclosure, the OAN device includes devices in an OAN phase, including an OLT and an ONU;

and the OTN device includes devices in an OTN phase, which are not particularly limited in the present disclosure.

In the present disclosure, management plane configuration of the management system or controller includes, but is not limited to, configuration of OAN slice IDs, OTN slice IDs, end-to-end slice IDs, and mapping relationships thereof, which is not particularly limited in the present disclosure. For example, an OAN slice ID may be configured for each OAN slice, an OTN slice ID may be configured for each OTN slice, an end-to-end slice ID may be configured for each end-to-end slice, and mapping relationships of the OAN slices and the OTN slices (that is, the end-to-end slices) may be established by configuring mapping relationships of the OAN slice IDs, the OTN slice IDs, and the end-to-end slice IDs on the management plane.

It should be noted that by the configuration method described in the present disclosure, end-to-end hard pipeline slicing can be implemented in XGS-PON (10G PON), as well as in GPON, XG-PON, COMBO-PON, NG-PON2, and 50G-PON, which is not particularly limited in the present disclosure.

It should be further noted that, in the present disclosure, a dividing range of the end-to-end slices includes, but is not limited to, physical port-based slices, slot granularity-based slices, service flow-based slices, forwarding plane inside the device based slices, and the like.

According to the configuration method provided in the present disclosure, the management system or the controller divides the OAN slice and the OTN slice according to the service flow, and establishes a mapping relationship between the OAN slice and the OTN slice, thereby establishing slicing from the OAN device to the OTN device, breaking through the end-to-end slicing from the OAN device to the OTN device, and implementing end-to-end hard pipeline slicing of the all-optical network. Therefore, the advantages of the all-optical network can be fully exerted, and the requirements of ultra-low latency services, high reliability service bearing, high quality value-added services, and the like can be satisfied.

In the present disclosure, the OAN slices are divided based on the OAN slot for transmitting OAN service flow, so that slot-based hard pipeline isolation in the OAN slice domain is achieved; and the OTN slices are divided based on the OTN slot for transmitting OTN service flow, so that slot-based hard pipeline isolation in the OTN slice domain is achieved.

Figure 3:
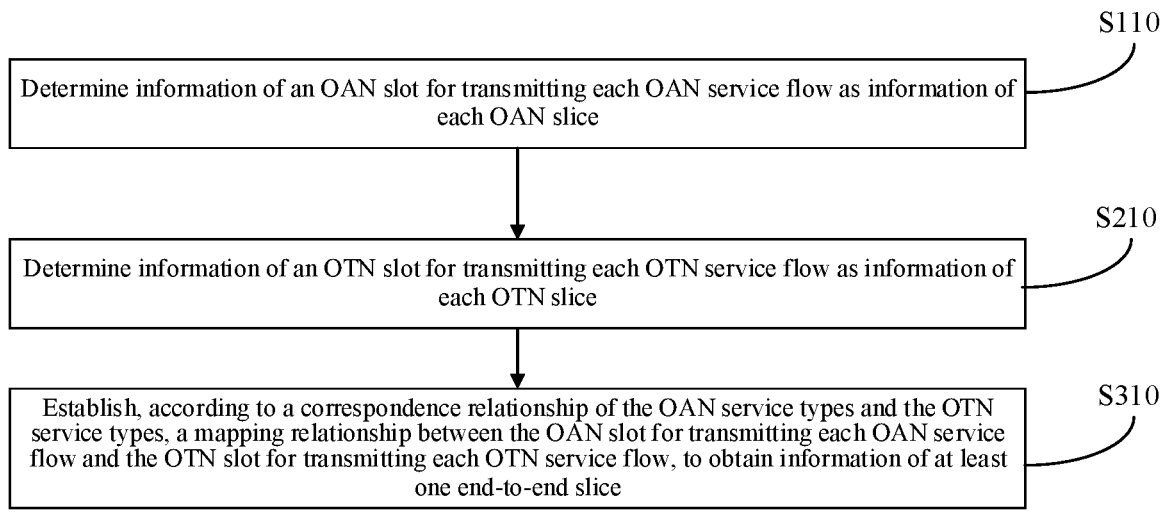
FIG. 3 is another flowchart of a configuration method according to the present disclosure.

In some embodiments, referring to FIG. 3, operation S100 includes operation S110, operation S200 includes operation S210, and operation S300 includes operation S310.

At operation S110, determining information of an OAN slot for transmitting each OAN service flow as information of each OAN slice.

At operation S210, determining information of an OTN slot for transmitting each OTN service flow as information of each OTN slice.

In the present disclosure, the OTN slot may be a slot based on the ODUk granularity or ODUj granularity, and accordingly, the OTN slice is a slice divided based on the ODUk granularity or ODUj granularity, or a slice divided based on a FlexE Channel of FlexE, which is not particularly limited in the present disclosure.

At operation S310, establishing, according to a correspondence relationship of the OAN service types and the OTN service types, a mapping relationship between the OAN slot for transmitting each OAN service flow and the OTN slot for transmitting each OTN service flow, to obtain information of at least one end-to-end slice.

How to identify OAN slice is not particularly limited in the present disclosure. For example, as shown in FIG. 24, an OAN slice may be identified with an Ethernet service flow ID (ETH Flow ID), and may be identified with an Alloc ID of a transmission container (T-CONT) in an uplink slot, while establishing mapping between a GPON encapsulation mode (GEM) port (GEMPORT) and the T-CONT. As shown in FIG. 25, an OAN slice may be identified with an ETH Flow ID, and may be identified with a GEMPORT ID in a downlink slot.

How to identify OTN slice is not particularly limited in the present disclosure. For example, an OTN slice may be identified with an ODUk granularity ID, an ODUj granularity ID, or by an FlexE granularity ID.

As an optional implementation, in the present disclosure, by establishing an Ethernet virtual connection (EVC) between the OAN slot and the OTN slot or by an internal service port of the OLT device, the OAN slice domain and the OTN slice domain is spliced to establish a mapping relationship between the OAN slice and the OTN slice. Therefore, the OLT device can map and relay an OAN service flow in the OAN slice to an OTN service flow in an OTN slice having a mapping relationship with the OAN slice (that is, an OTN slice belonging to a same end-to-end slice as the OAN slice) in an upstream direction, and can map and relay an OTN service flow in an OTN slice to an OAN service flow in an OAN slice having a mapping relationship with the OTN slice (that is, an OAN slice belonging to a same end-to-end slice as the OTN slice) in a downstream direction.

Figure 4:
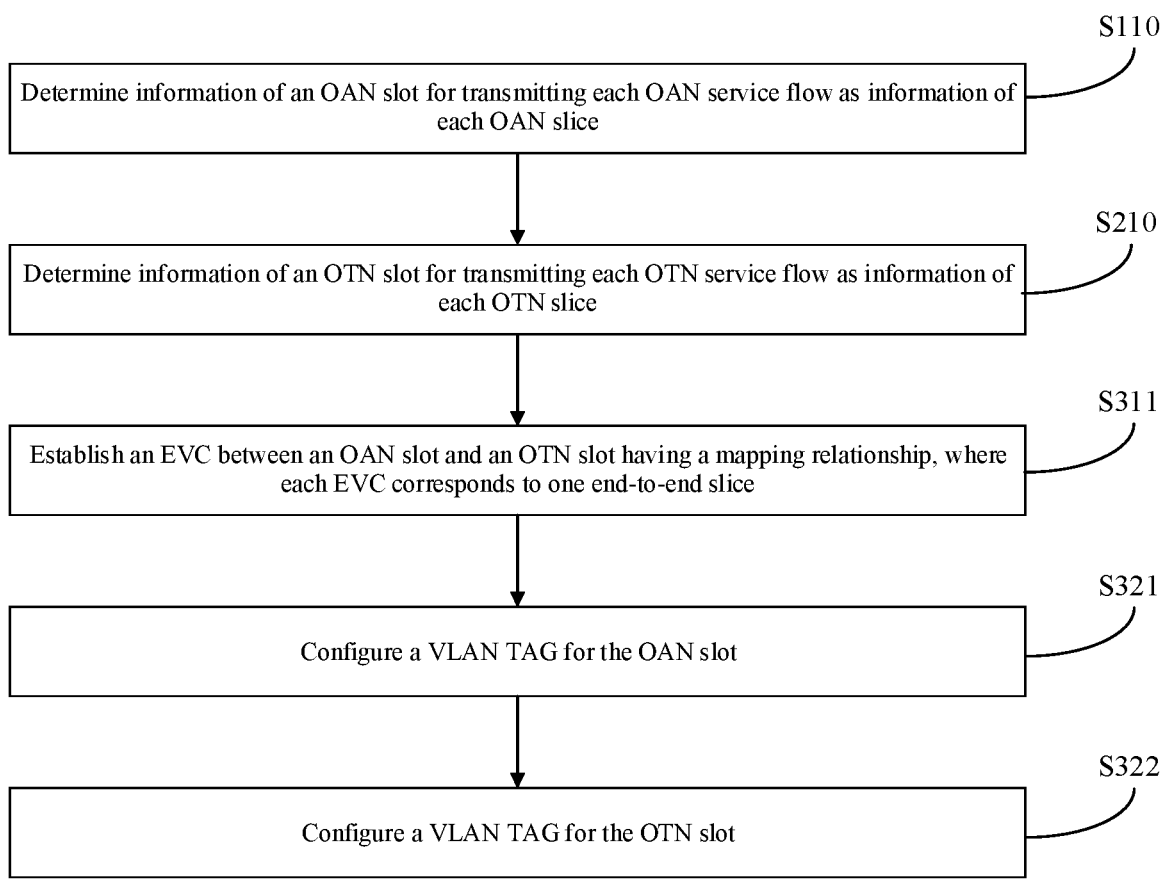
FIG. 4 is yet another flowchart of a configuration method according to the present disclosure.

In some embodiments, referring to FIG. 4, operation S310 includes operation S311.

At operation S311, establishing an EVC between an OAN slot and an OTN slot having a mapping relationship, where each EVC corresponds to one end-to-end slice, information of a user network interface (UNI) in the EVC represents the OAN slot, and information of another UNI in the EVC represents the OTN slot.

The EVC, as a concept proposed by the Metro Ethernet Forum (MEF), is defined as a virtual connection that connects two or more UNIs and exchanges Ethernet service frames between the two or more UNIs.

In the present disclosure, the meaning of UNI in the EVC is extended such that the OAN slot is taken as the UNI of the EVC in the OAN slice domain, and the OTN slot is taken as the UNI of the EVC in the OTN slice domain. In the present disclosure, the management system or controller establishes the EVC between the OAN slot and the OTN slot by configuring mapping relationships of OAN slot IDs, EVC IDs, and OTN slot IDs.

Figure 5:
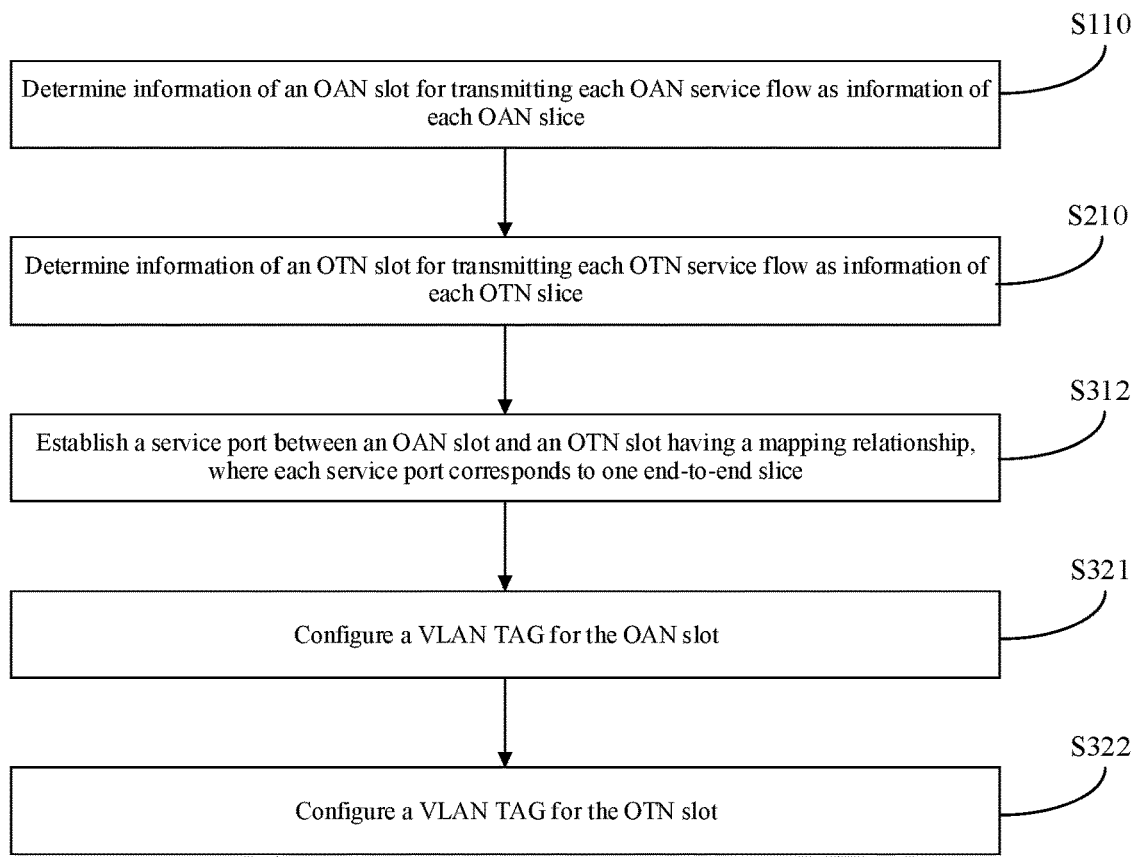
FIG. 5 is still another flowchart of a configuration method according to the present disclosure.

In some other embodiments, referring to FIG. 5, operation S310 includes operation S312.

At operation S312, establishing a service port between an OAN slot and an OTN slot having a mapping relationship, where each service port corresponds to one end-to-end slice, information of a UNI in the service port represents the OAN slot, and information of another UNI in the service port represents the OTN slot.

It should be noted that the service port in operation S312 is an internal service port of the OLT device. In the present disclosure, the management system or controller establishes the service port between the OAN slot and the OTN slot by configuring mapping relationships of OAN slot IDs, service port IDs, and OTN slot IDs.

It should be noted that, in the present disclosure, if the OLT and the OTN are connected to a same device, the number of service ports in the OAN slice domain and the number of service ports in the OTN slice domain are in a 1:1 relationship. Therefore, the OAN slice domain and the OTN slice domain may share the service port, which is not particularly limited in the present disclosure.

It should be further noted that, in the present disclosure, when an EVC or a service port is established between the OAN slot and the OTN slot to splice the OAN slice domain and the OTN slice domain and establish a mapping relationship between the OAN slice and the OTN slice, transmission characteristics of the service flow may be defined. For example, the transmission characteristics of the service flow may include, for example, a committed information rate (CIR), a peak information rate (PIR), a committed burst size (CBS), a peak burst size (PBS), an excess burst size (EBS), or other quality of service (QOS) parameters, or may further include bandwidth, protection level, packet loss rate requirements of the service flow, or any customized service flow-level feature description. This is not particularly limited in the present disclosure. As an optional implementation, when an EVC is established between the OAN slot and the OTN slot to splice the OAN slice domain and the OTN slice domain, an EVC profile is bound, through which transmission characteristics of the service flow are defined.

As an optional implementation, the EVC or service port may be further bound or configured with a virtual local area network tag (VLAN TAG), according to which an OAN service flow in the OAN slice can be mapped and relayed to an OTN service flow in an OTN slice having a mapping relationship with the OAN slice (that is, an OTN slice belonging to a same end-to-end slice as the OAN slice) in an upstream direction, and an OTN service flow in the OTN slice can be mapped and relayed an OAN service flow in an OAN slice having a mapping relationship with the OTN slice (that is, an OAN slice belonging to a same end-to-end slice as the OTN slice) in a downstream direction. In the present disclosure, the EVC or service port may be bound or configured with a single-layer CVLAN, or a dual-layer SVLAN+CVLAN, which is not particularly limited in the present disclosure.

Referring to FIG. 4 or 5, operation S300 may further include operations S321 to S322.

At operation S321, configuring a VLAN TAG for the OAN slot.

At operation S322, configuring a VLAN TAG for the OTN slot.

A same VLAN TAG is configured for an OAN slot and an OTN slot having a mapping relationship.

In a PON network, the OAN service flow is born on a GEMPORT unit. One GEMPORT unit bears one or more OAN service flows, and a GEMPORT ID of the GEMPORT unit can be used to identify the OAN service flow born on the GEMPORT unit.

As an optional implementation, in the downlink direction from OTN to OAN, the management system or controller divides the OAN slices by configuring a mapping relationship between GEMPORT IDs and the OAN slices.

Figure 6:
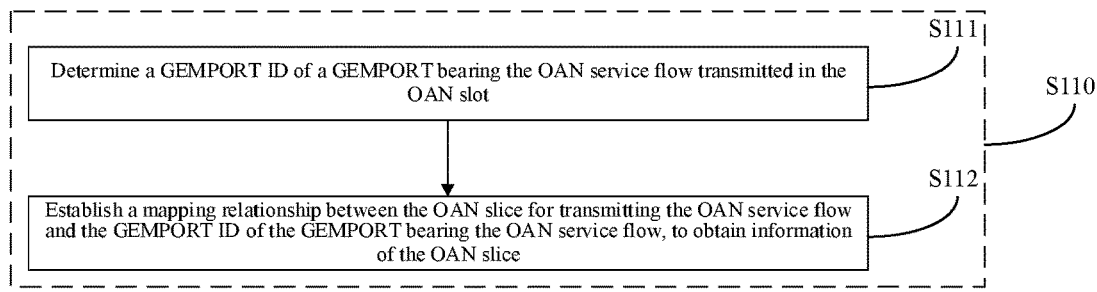
FIG. 6 is still another flowchart of a configuration method according to the present disclosure.

Referring to FIG. 6, in some embodiments, operation S110 may include operations S111 to S112.

At operation S111, determining a GEMPORT ID of a GEMPORT bearing the OAN service flow transmitted in the OAN slot.

At operation S112, establishing a mapping relationship between the OAN slice for transmitting the OAN service flow and the GEMPORT ID of the GEMPORT bearing the OAN service flow, to obtain information of the OAN slice.

It should be further noted that, in the present disclosure, in the case of dividing OAN slices based on the GEMPORT ID, when an EVC or a service port is established between the OAN slot and the OTN slot to splice the OAN slice domain and the OTN slice domain and establish a mapping relationship between the OAN slice and the OTN slice, the GEMPORT ID is used as a UNI of the EVC or service port in the OAN slice domain.

As an optional implementation, in the uplink direction from OAN to OTN, the OAN service flow is encapsulated into a GEMPORT unit in the ONU, and then the GEMPORT unit needs to be mapped to a T-CONT unit for uplink service scheduling. The T-CONT indicates explicit data start/stop instructions through a bandwidth of bandwidth map (BW-map), which instructions may be used as slot information of the OAN slice.

Figure 7:
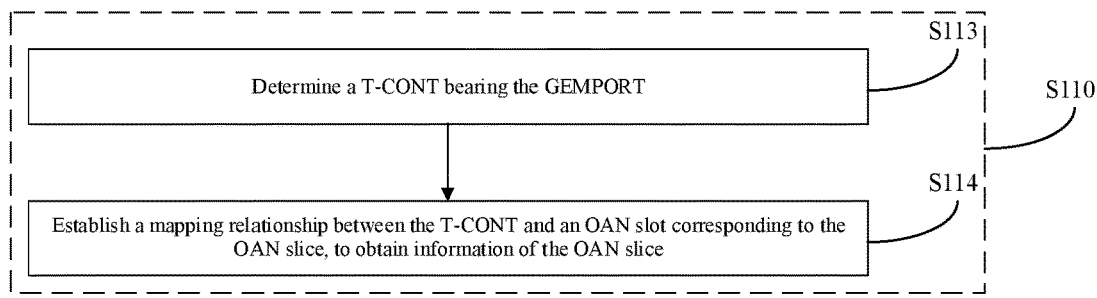
FIG. 7 is still another flowchart of a configuration method according to the present disclosure.

Referring to FIG. 7, in some embodiments, operation S110 may include operations S113 to S114.

At operation S113, determining a T-CONT bearing the GEMPORT.

At operation S114, establishing a mapping relationship between the T-CONT and an OAN slot corresponding to the OAN slice, to obtain information of the OAN slice.

Figure 8:
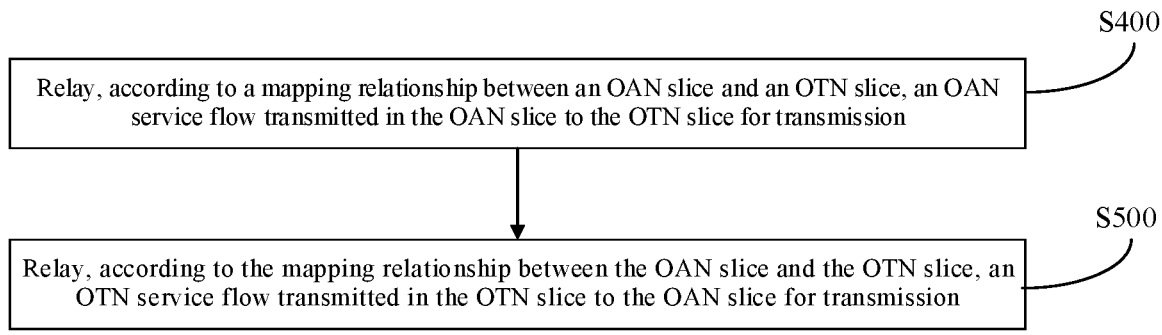
FIG. 8 is a flowchart of a data transmission method according to the present disclosure.

Referring to FIG. 8, the present disclosure provides a data transmission method, including operations S400 and/or S500.

At operation S400, relaying, according to a mapping relationship between an OAN slice and an OTN slice, an OAN service flow transmitted in the OAN slice to the OTN slice for transmission.

At operation S500, relaying, according to the mapping relationship between the OAN slice and the OTN slice, an OTN service flow transmitted in the OTN slice to the OAN slice for transmission.

In the present disclosure, the management system or controller establishes, according to a correspondence relationship of the OAN service types and the OTN service types, a mapping relationship between the OAN slice and the OTN slice, and splices the OAN slice domain and the OTN slice domain to establish an end-to-end slice corresponding to each mapping relationship. The term "end-to-end slice" refers to a slice from the OAN device to OTN device. In the present disclosure, the OAN device includes devices in an OAN phase, including an OLT and an ONU; and the OTN device includes devices in an OTN phase, which are not particularly limited in the present disclosure.

In the present disclosure, management plane configuration of the management system or controller includes, but is not limited to, configuration of OAN slice IDs, OTN slice IDs, end-to-end slice IDs, and mapping relationships thereof, which is not particularly limited in the present disclosure. For example, an OAN slice ID may be configured for each OAN slice, an OTN slice ID may be configured for each OTN slice, an end-to-end slice ID may be configured for each end-to-end slice, and mapping relationships of the OAN slices and the OTN slices (that is, the end-to-end slices) may be established by configuring mapping relationships of the OAN slice IDs, the OTN slice IDs, and the end-to-end slice IDs on the management plane.

On the forwarding plane, according to configuration information of the management system or controller on the management plane, an OLT device relays an OAN service flow in the OAN slice to the OTN slice for transmission in the uplink direction; and relays an OTN service flow in the OTN slice to the OAN slice for transmission in the downlink direction.

It should be noted that when the OAN service flow or the OTN service flow is relayed in the OLT device, service isolation can be performed according to the end-to-end slice, and the end-to-end slice is established by establishing a mapping relationship between the OAN slice and the OTN slice.

The data transmission method according to the present disclosure may be applied in XGS-PON (10G PON), GPON, XG-PON, COMBO-PON, NG-PON2, or 50G-PON, which is not particularly limited in the present disclosure.

It should be further noted that, in the present disclosure, a dividing range of the end-to-end slices includes, but is not limited to, physical port-based slices, slot granularity-based slices, service flow-based slices, forwarding plane inside the device based slices, and the like.

According to the data transmission method provided in the present disclosure, the OLT can, according to the mapping relationship between the OAN slice and the OTN slice configured by the management system or the controller on the management plane, relay and forward the service flow in the OAN slice or the service flow in the OTN slice, so that the forwarding plane splicing of the end-to-end slice from the OAN device to the OTN device is implemented, and end-to-end hard pipeline slicing of the all-optical network is achieved. Therefore, the advantages of the all-optical network can be fully exerted, and the requirements of ultra-low latency services, high reliability service bearing, high quality value-added services, and the like can be satisfied.

In the present disclosure, the OAN slices are divided based on the OAN slot for transmitting OAN service flow, so that slot-based hard pipeline isolation in the OAN slice domain is achieved; and the OTN slices are divided based on the OTN slot for transmitting OTN service flow, so that slot-based hard pipeline isolation in the OTN slice domain is achieved.

As an optional implementation, by establishing an EVC between the OAN slot and the OTN slot or by an internal service port of the OLT device, the OAN slice domain and the OTN slice domain is spliced to establish a mapping relationship between the OAN slice and the OTN slice. Therefore, the OLT device can map and relay an OAN service flow in the OAN slice to an OTN service flow in an OTN slice having a mapping relationship with the OAN slice (that is, an OTN slice belonging to a same end-to-end slice as the OAN slice) in an upstream direction.

Figure 9:
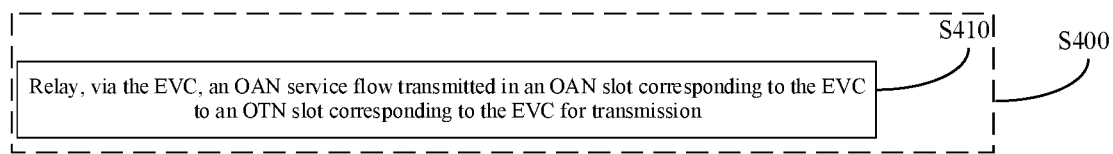
FIG. 9 is another flowchart of a data transmission method according to the present disclosure.

In some embodiments, the mapping relationship between the OAN slice and the OTN slice includes a mapping relationship between the OAN slot for transmitting each OAN service flow and the OTN slot for transmitting each OTN service flow, and an EVC is established between an OAN slot and an OTN slot having a mapping relationship. Referring to FIG. 9, operation S400 may include operation S410.

At operation S410, relaying, via the EVC, an OAN service flow transmitted in an OAN slot corresponding to the EVC to an OTN slot corresponding to the EVC for transmission.

The EVC, as a concept proposed by the MEF, is defined as a virtual connection that connects two or more UNIs and exchanges Ethernet service frames between the two or more UNIs.

In the present disclosure, the meaning of UNI in the EVC is extended such that the OAN slot is taken as the UNI of the EVC in the OAN slice domain, and the OTN slot is taken as the UNI of the EVC in the OTN slice domain.

Figure 10:
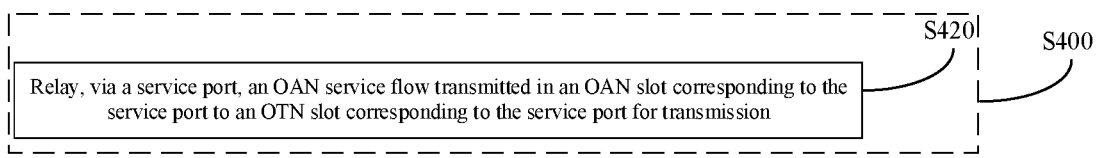
FIG. 10 is yet another flowchart of a data transmission method according to the present disclosure.

In some other embodiments, the mapping relationship between the OAN slice and the OTN slice includes a mapping relationship between the OAN slot for transmitting each OAN service flow and the OTN slot for transmitting each OTN service flow, and a service port is established between an OAN slot and an OTN slot having a mapping relationship. Referring to FIG. 10, operation S400 may include operation S420.

At operation S420, relaying, via the service port, an OAN service flow transmitted in an OAN slot corresponding to the service port to an OTN slot corresponding to the service port for transmission.

It should be noted that the service port in operation S420 is an internal service port of the OLT device.

As an optional implementation, the EVC or service port may be bound or configured with a VLAN TAG, so that the OLT device can, based on the VLAN TAG, map and relay an OAN service flow in the OAN slice to an OTN service flow in an OTN slice having a mapping relationship with the OAN slice (that is, an OTN slice belonging to a same end-to-end slice as the OAN slice) in an upstream direction. In the present disclosure, the EVC or service port may be bound or configured with a single-layer CVLAN, or a dual-layer SVLAN+CVLAN, which is not particularly limited in the present disclosure.

Figure 11:
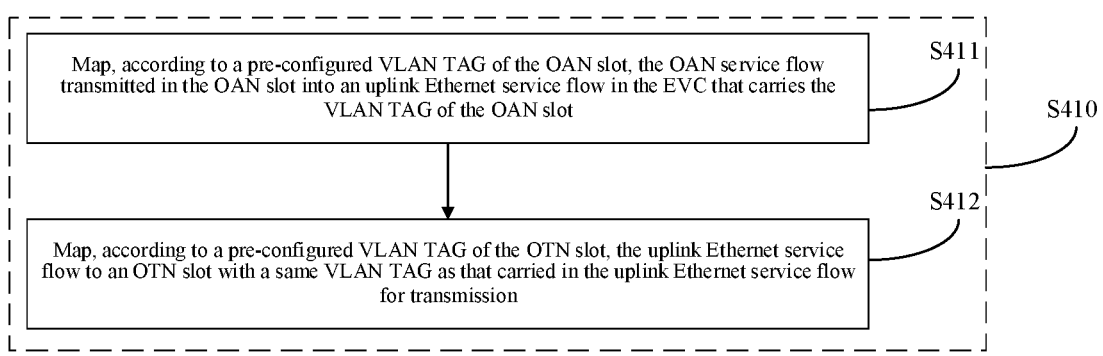
FIG. 11 is still another flowchart of a data transmission method according to the present disclosure.

In the uplink direction, referring to FIG. 11, in some embodiments, operation S410 may include operations S411 to S412.

At operation S411, mapping, according to a pre-configured VLAN TAG of the OAN slot, the OAN service flow transmitted in the OAN slot into an uplink Ethernet service flow in the EVC that carries the VLAN TAG of the OAN slot.

At operation S412, mapping, according to a pre-configured VLAN TAG of the OTN slot, the uplink Ethernet service flow to an OTN slot with a same VLAN TAG as that carried in the uplink Ethernet service flow for transmission.

In a PON network, the OAN service flow is born on a GEMPORT unit. One GEMPORT unit bears one or more OAN service flows, and a GEMPORT ID of the GEMPORT unit can be used to identify the OAN service flow born on the GEMPORT unit.

As an optional implementation, in the present disclosure, the management system or controller divides the OAN slices by configuring a mapping relationship between GEMPORT IDs and the OAN slices. In the uplink direction from OAN to OTN, the OAN service flow is encapsulated into a GEMPORT unit in the ONU, and then the GEMPORT unit needs to be mapped to a T-CONT unit for uplink service scheduling. The T-CONT indicates explicit data start/stop instructions through a bandwidth of BWmap, which instructions may be used as slot information of the OAN slice.

In the present disclosure, the management system or controller configures a mapping relationship between the OAN slice and the GEMPORT ID.

As an optional implementation, the OLT device performs dynamic bandwidth allocation (DBA) scheduling on T-CONTs under a same OAN slice.

Figure 12:
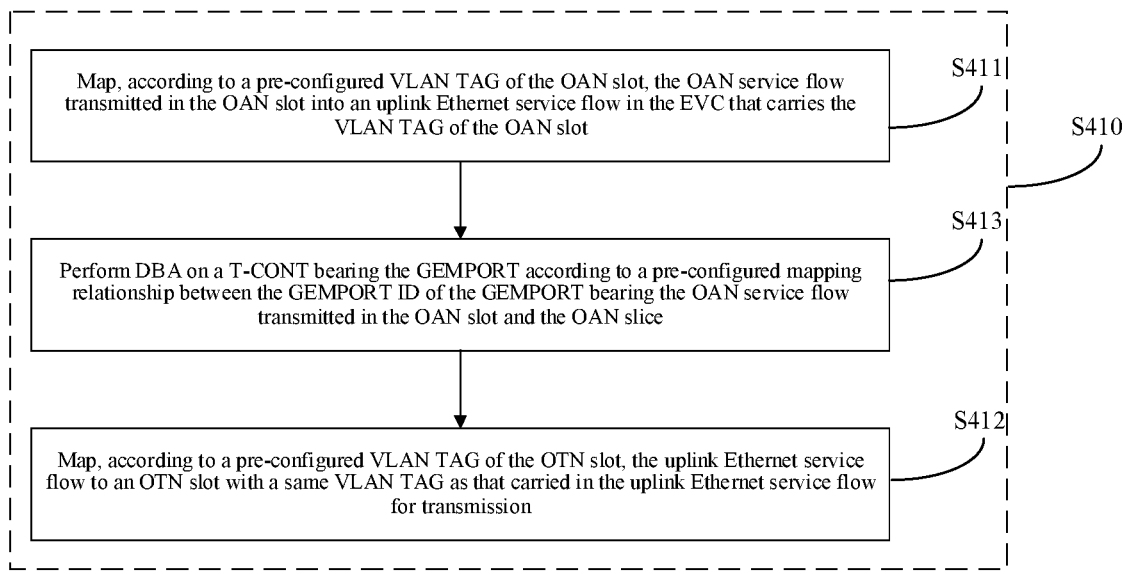
FIG. 12 is still another flowchart of a data transmission method according to the present disclosure.

In the uplink direction, in some embodiments, referring to FIG. 12, before operation S412, operation S410 may further include operation S413.

At operation S413, performing DBA on a T-CONT bearing the GEMPORT according to a pre-configured mapping relationship between the GEMPORT ID of the GEMPORT bearing the OAN service flow transmitted in the OAN slot and the OAN slice, where the DBA is independent in different OAN slices.

It should be further noted that, in the present disclosure, the scheduling policies for DBA of different OAN slices are independent of each other. A same DBA policy or different DBA policies may be adopted for different OAN slices, which is not particularly limited in the present disclosure. As an optional implementation, one PON port supports DBA of 8 uplink OAN slices.

As an optional implementation, by establishing an EVC between the OAN slot and the OTN slot or by an internal service port of the OLT device, the OAN slice domain and the OTN slice domain is spliced to establish a mapping relationship between the OAN slice and the OTN slice. Therefore, the OLT device can map and relay an OTN service flow in the OTN slice to an OAN service flow in an OAN slice having a mapping relationship with the OTN slice (that is, an OAN slice belonging to a same end-to-end slice as the OTN slice) in a downstream direction.

Figure 13:
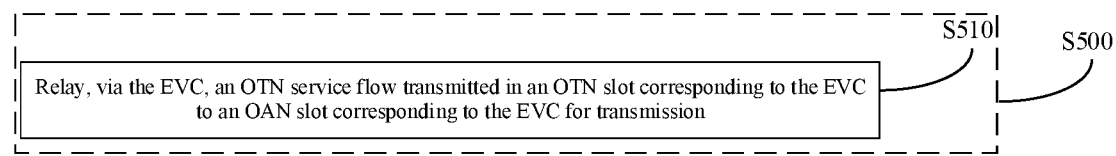
FIG. 13 is still another flowchart of a data transmission method according to the present disclosure.

In some embodiments, the mapping relationship between the OAN slice and the OTN slice includes a mapping relationship between the OAN slot for transmitting each OAN service flow and the OTN slot for transmitting each OTN service flow, and an EVC is established between an OAN slot and an OTN slot having a mapping relationship. Referring to FIG. 13, operation S500 may include operation S510.

At operation S510, relaying, via the EVC, an OTN service flow transmitted in an OTN slot corresponding to the EVC to an OAN slot corresponding to the EVC for transmission.

Figure 14:
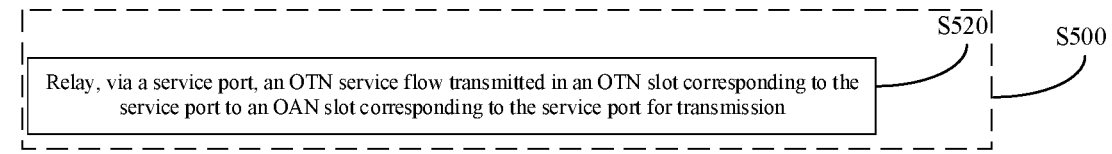
FIG. 14 is still another flowchart of a data transmission method according to the present disclosure.

In some embodiments, the mapping relationship between the OAN slice and the OTN slice includes a mapping relationship between the OAN slot for transmitting each OAN service flow and the OTN slot for transmitting each OTN service flow, and a service port is established between an OAN slot and an OTN slot having a mapping relationship. Referring to FIG. 14, operation S500 may include operation S520.

At operation S520, relaying, via the service port, an OTN service flow transmitted in an OTN slot corresponding to the service port to an OAN slot corresponding to the service port for transmission.

As an optional implementation, the EVC or service port may be bound or configured with a VLAN TAG, so that the OLT device can, based on the VLAN TAG, map and relay an OTN service flow in the OTN slice to an OAN service flow in an OAN slice having a mapping relationship with the OTN slice (that is, an OAN slice belonging to a same end-to-end slice as the OTN slice) in a downstream direction. In the present disclosure, the EVC or service port may be bound or configured with a single-layer CVLAN, or a dual-layer SVLAN+CVLAN, which is not particularly limited in the present disclosure.

Figure 15:
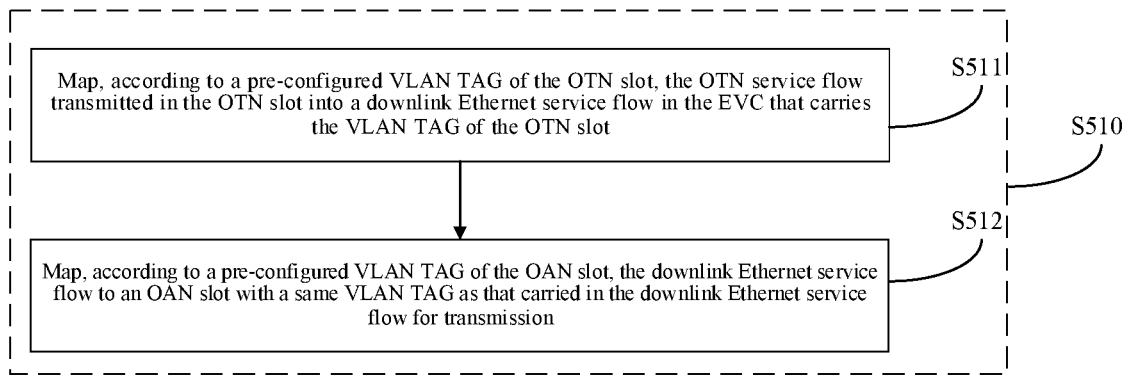
FIG. 15 is still another flowchart of a data transmission method according to the present disclosure.

In the downlink direction, referring to FIG. 15, operation S510 may include operations S511 to S512.

At operation S511, mapping, according to a pre-configured VLAN TAG of the OTN slot, the OTN service flow transmitted in the OTN slot into a downlink Ethernet service flow in the EVC that carries the VLAN TAG of the OTN slot.

At operation S512, mapping, according to a pre-configured VLAN TAG of the OAN slot, the downlink Ethernet service flow to an OAN slot with a same VLAN TAG as that carried in the downlink Ethernet service flow for transmission.

In the present disclosure, the mapping relationship between the OAN slot and the OAN slice may be embodied in an OAN downlink service frame. As an optional implementation, the mapping relationship between the OAN slot and the OAN slice specifically includes mapping between the GEMPORT ID and the OAN slice.

Figure 16:
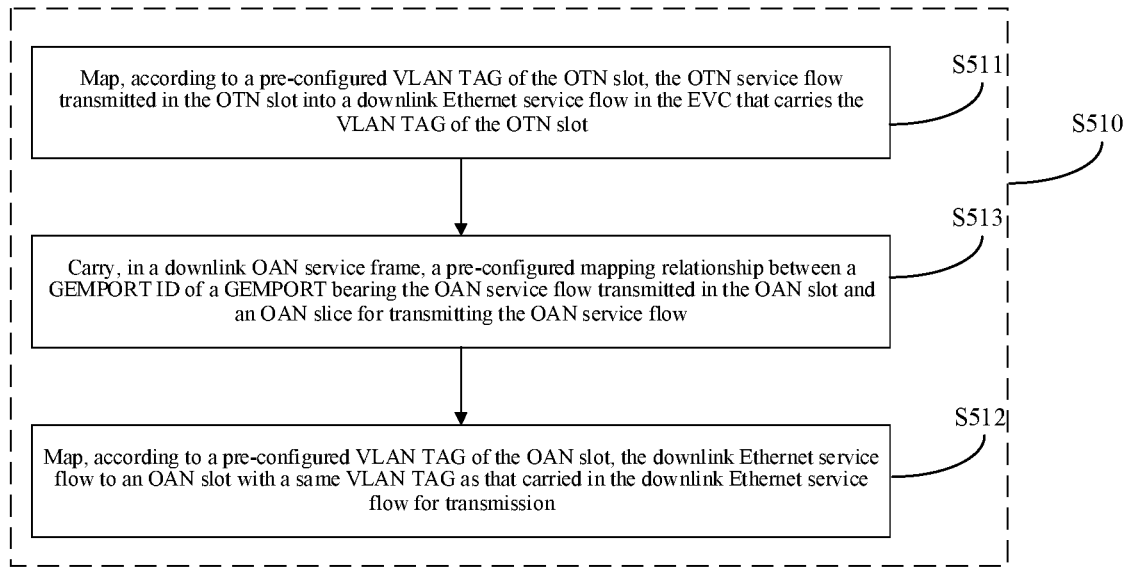
FIG. 16 is still another flowchart of a data transmission method according to the present disclosure.

Referring to FIG. 16, the OAN slot is identified by a GEMPORT ID of a GEMPORT bearing the OAN flow transmitted in the OAN slot, and before operation S512, operation S510 may further include operation S513.

At operation S513, carrying, in a downlink OAN service frame, a pre-configured mapping relationship between a GEMPORT ID of a GEMPORT bearing the OAN service flow transmitted in the OAN slot and an OAN slice for transmitting the OAN service flow.

Figure 17:
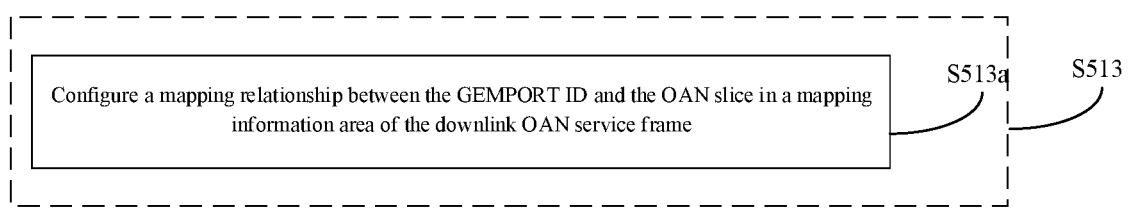
FIG. 17 is still another flowchart of a data transmission method according to the present disclosure.

As an optional implementation, referring to FIG. 17, operation S513 may include operation S513a.

At operation S513a, configuring the mapping relationship between the GEMPORT ID and the OAN slice in a mapping information area of the downlink OAN service frame.

How to perform operation S513a is not particularly limited in the present disclosure. As an optional implementation, an area may be added between a physical synchronization block downstream (PSBd) header and a payload area, which embodies a mapping relationship between an XG-PON encapsulation mode port (XGEMPORT) ID of a subsequent payload area and a slice ID. In the case of a standard frame format of the XGEMPORT payload area and the PSBd header in the downlink standard, an information description area for the mapping relationship between the XGEMPORT ID of the payload area and the slice ID may be added between the XGEMPORT ID of the payload area and the slice ID. The downlink XGEMPORT ID is suitable for establishing an explicit mapping relationship with the slice ID, by which mapping of the XGEMPORT ID and the slice ID is established, so that slice division based on the granularity of ONU or ONU UNI can be applied.

Figure 18:
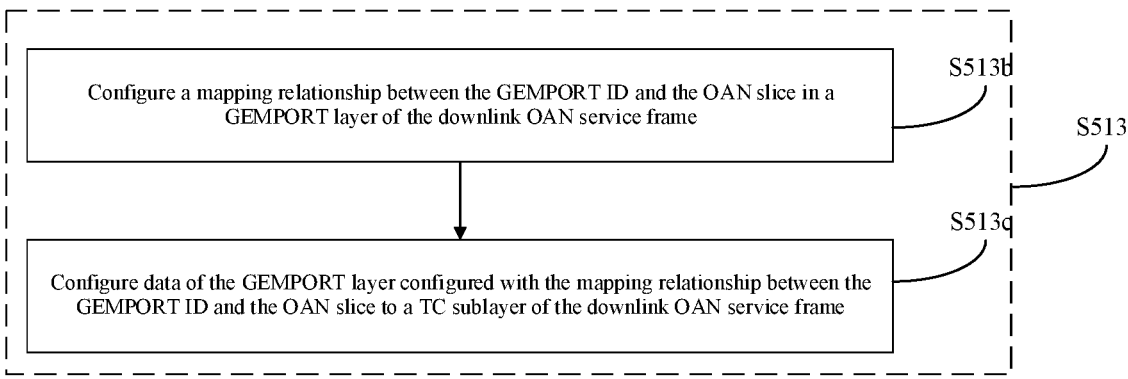
FIG. 18 is still another flowchart of a data transmission method according to the present disclosure.

As another optional implementation, referring to FIG. 18, operation S513 may include operations S513b to S513c.

At operation S513b, configuring a mapping relationship between the GEMPORT ID and the OAN slice in a GEMPORT layer of the downlink OAN service frame.

At operation S513c, configuring data of the GEMPORT layer configured with the mapping relationship between the GEMPORT ID and the OAN slice to a transmission convergence (TC) sublayer of the downlink OAN service frame.

How to perform operations S513b to S513c is not particularly limited in the present disclosure. As an optional implementation, slice ID information may be added at the XGTC (XG-PON TC) layer, and after each XGEMPORT header of the XGEMPORT payload area, the slice ID is nested into each XGEMPORT header by double nesting in the payload area. All XGEMPORTs containing the slice ID information are used as data of the XGTC payload area as a whole.

Figure 19:
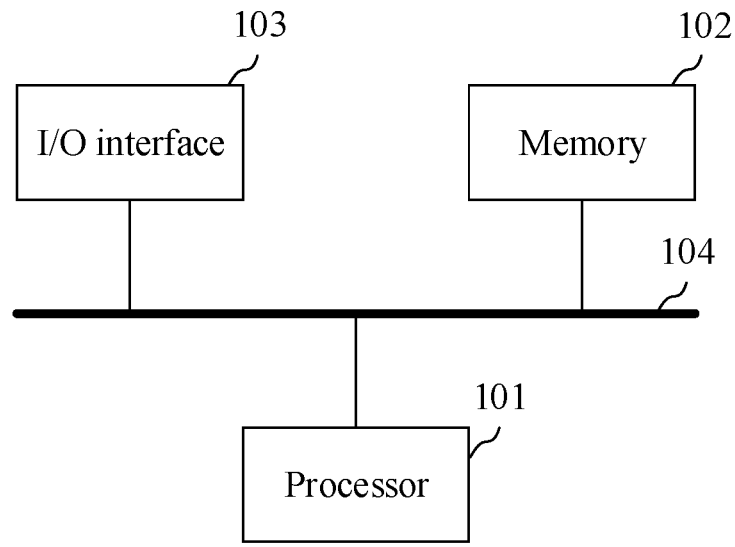
FIG. 19 is a block diagram of a controller according to the present disclosure.

Referring to FIG. 19, the present disclosure provides a controller, including: one or more processors 101; and a memory 102 having one or more programs stored thereon which, when executed by the one or more processors 101, cause the one or more processors 101 to implement the configuration method according to any embodiment of the present disclosure each.

In addition, the controller may further include one or more I/O interfaces 103 connected between the processor 101 and the memory 102, to implement information interaction between the processor 101 and the storage device 102.

The processor 101 may be a device with a data processing capability, including but not limited to a central processing unit (CPU), or the like; the memory 102 may be a device with a data storage capability including but not limited to, a random access memory (RAM, more specifically SDRAM, DDR, etc.), a read only memory (ROM), an electrically erasable programmable read only memory (EEPROM) or a flash memory (FLASH); and the I/O interface 103 is connected between the processor 101 and the memory 102 to implement information interaction between the processor 101 and the storage device 102, and includes, but is not limited to, a data bus and the like.

In some embodiments, the processor 101, the memory 102, and the I/O interface 103 are interconnected via a bus 104, and in turn connected to other components of a computing device.

Figure 20:
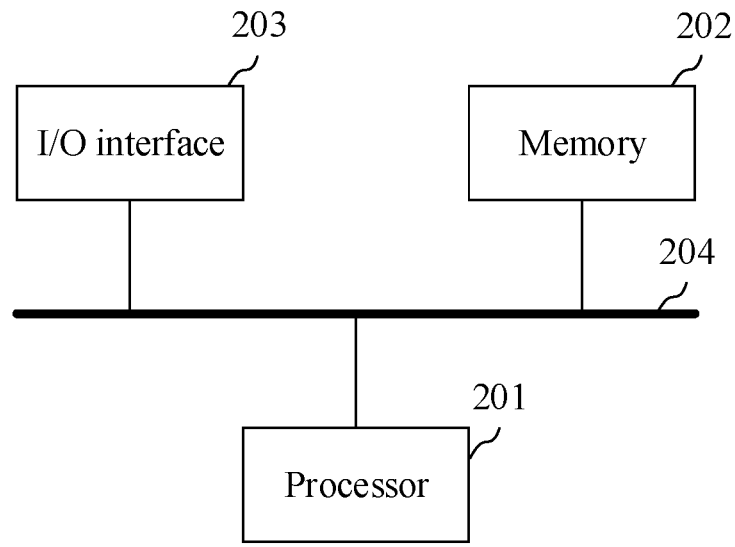
FIG. 20 is a block diagram of an OLT according to the present disclosure.

Referring to FIG. 20, the present disclosure provides an OLT, including: one or more processors 201; and a memory 202 having one or more programs stored thereon which, when executed by the one or more processors 201, cause the one or more processors 201 to implement the data transmission method according to any embodiment of the present disclosure.

In addition, the OLT may further include one or more I/O interfaces 203 connected between the processor 201 and the memory 202, to implement information interaction between the processor 201 and the storage device 202.

The processor 201 may be a device with a data processing capability, including but not limited to a central processing unit (CPU), or the like; the memory 202 may be a device with a data storage capability including but not limited to, a random access memory (RAM, more specifically SDRAM, DDR, etc.), a read only memory (ROM), an electrically erasable programmable read only memory (EEPROM) or a flash memory (FLASH); and the I/O interface 203 is connected between the processor 201 and the memory 202 to implement information interaction between the processor 201 and the storage device 202, and includes, but is not limited to, a data bus and the like.

In some embodiments, the processor 201, the memory 202, and the I/O interface 203 are interconnected via a bus 204, and in turn connected to other components of a computing device.

Figure 21:
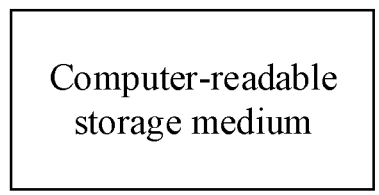
FIG. 21 is a block diagram of a computer-readable storage medium according to the present disclosure.

Referring to FIG. 21, the present disclosure provides a computer-readable storage medium storing a computer program thereon which, when executed by a processor, causes the processor to implement at least one of the configuration method or the data transmission method according to any embodiment of the present disclosure.

In order to make those skilled in the art understand the technical solutions in the present disclosure more clearly, the technical solutions provided in the present disclosure are described in detail below through specific examples.

Specific Example I

A management system or controller performs service planning, plans service flow level slices, and distinguishes the slices with end-to-end slice IDs.

In this example, flow level slice division in the OAN slice domain can be implemented based on an Ethernet service flow, different OAN slices are distinguished with slice IDs a, b, and c, and a functional domain of the OAN slices ranges from service flow input of the ONU device to uplink port output of the OLT device; and slot level slice division of the OTN slice domain can be implemented based on an OTN slot granularity, different slot slices are distinguished with slice IDs a1, b1, and c1, and a functional domain of the OTN slices ranges from the uplink port output of the OLT device to an egress for leaving the whole OTN.

Figure 22A:
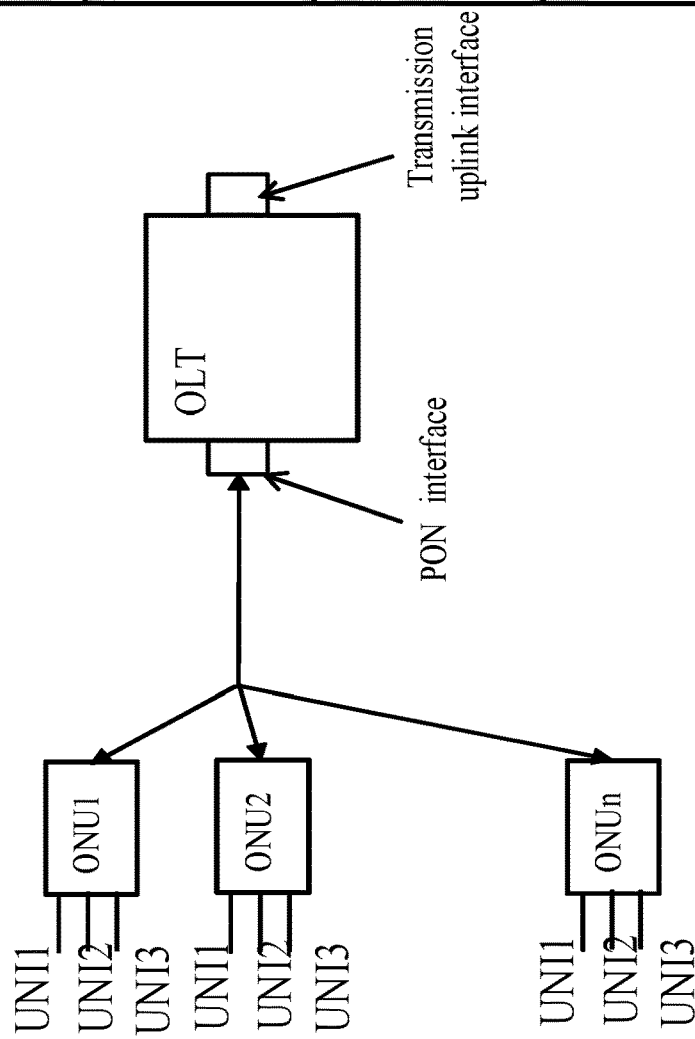
FIGS. 22A and 22B are schematic diagrams showing mapping relationships of OAN slices and OTN slices according to the present disclosure.
Figure 22B:
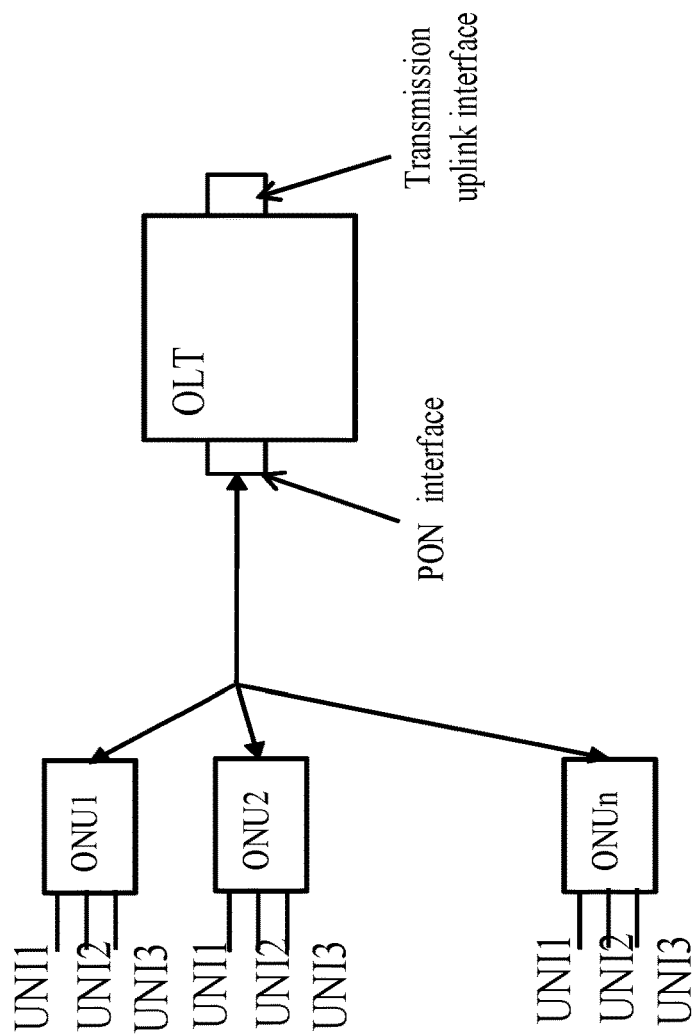

In this example, for various defined service flows, according to the management requirement, as shown in FIG. 22A, more refined service flow isolation may be implemented in the OAN slice domain, where the OAN slice and the OTN slice have a 1:1 mapping relationship to implement end-to-end service isolation; or as shown in FIG. 22B, a plurality of OAN slices of a same type are collectively classified in the OTN slice, where the OAN slice and the OTN slice have an N:1 mapping relationship (N is an integer greater than 1).

The management system or controller may complete configuration and establishment of a global mapping relationship from data flows to end-to-end slices from the OAN slice domain to the OTN slice domain.

Figure 23:
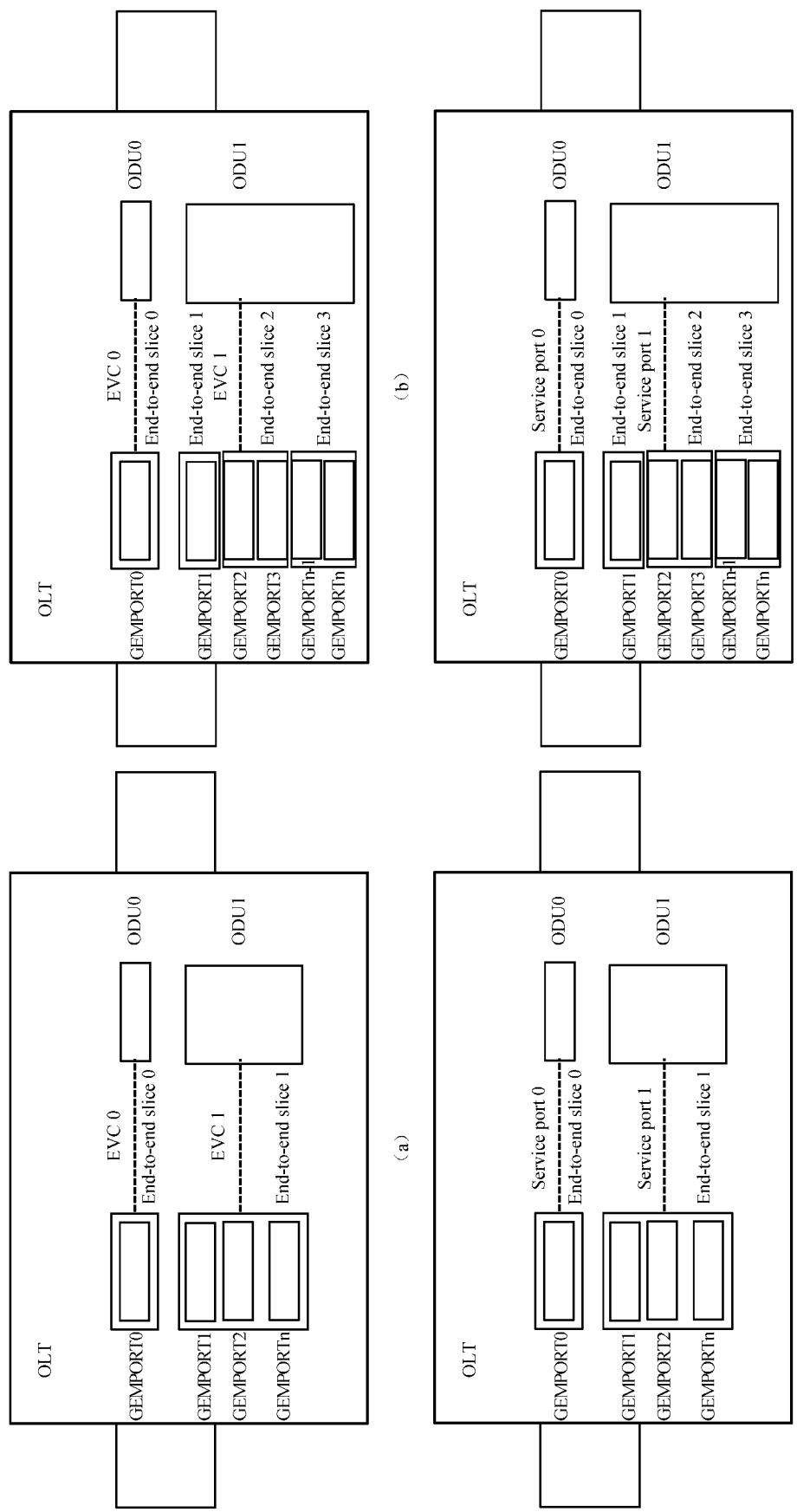
FIG. 23 is a schematic diagram showing mapping splicing of OAN slices and OTN slices according to the present disclosure.

In this example, as shown in (a) and (b) of FIG. 23, mapping splicing of OAN slice IDs and OTN slice IDs may be implemented through MEF EVC mapping. In addition, as shown in (c) and (d) of FIG. 23, mapping splicing of OAN slice IDs and OTN slice IDs may be implemented through a service port. In (a) and (c) of FIG. 23, the OAN slice and the OTN slice have a 1:1 mapping relationship. In (b) and (d) of FIG. 23, the OAN slice and the OTN slice have an N:1 mapping relationship (N is an integer greater than 1).

In this example, the OAN slice and the OTN slice have a 1:1 mapping relationship as shown in FIG. 22A.

The mapping splicing of OAN slice IDs and OTN slice IDs implemented through MEF EVC mapping is as shown in table 1.

TABLE 1

| service and end-to-end slice IDs | OAN slice domain ID | EVC mapping ID | OTN slice domain ID | EVC profile ID | OAN slice domain forwarding plane ID | OTN slice domain forwarding plane ID |
|---|---|---|---|---|---|---|
| service a, slice a0 | a | EVC_a (a to a1 mapping) | a1 | Profile_a | CVLAN/ SVLAN/ S + C VLAN | ODU_a |
| service b, slice b0 | b | EVC_b (b to b1 mapping) | b1 | Profile_b | CVLAN/ SVLAN/ S + C VLAN | ODU_b |
| service c, slice c0 | c | EVC_c (c to c1 mapping) | c1 | Profile_c | CVLAN/ SVLAN/ S + C VLAN | ODU_c |

The mapping splicing of OAN slice IDs and OTN slice IDs implemented through the service port is as shown in table 2.

TABLE 2

| service and end-to-end slice IDs | OAN slice domain ID | service port | OTN slice domain ID | service profile ID | OAN slice domain forwarding plane ID | OTN slice domain forwarding plane ID |
|---|---|---|---|---|---|---|
| service a, slice a0 | a | serviceport_a (a to a1 mapping) | a1 | Profile_a | CVLAN/ SVLAN/ S + C VLAN | ODU_a |
| service b, slice b0 | b | serviceport_b (b to b1 mapping) | b1 | Profile_b | CVLAN/ SVLAN/ S + C VLAN | ODU_b |
| service c, slice c0 | c | serviceport_c (c to c1 mapping) | c1 | Profile_c | CVLAN/ SVLAN/ S + C VLAN | ODU_c |

Mapping relationships from the OAN slices to uplink slots and downlink slots at the PON TC layer are further refined and configured.

A configuration example for the uplink service is as shown in table 3.

TABLE 3

| service plan | service and end-to-end slice IDs | OAN slice (i.e., OLT + ONU slice division plan) | uplink TC layer |
|---|---|---|---|
| 5G speech | service a, slice a0 | slice a: uplink bandwidth 1 (1 Gbps) + ONU1 UNI1 + ONU2 UNI1 + ONUn UNI1 | T-CONT1: ONU1 GEMPORT: [1] + ONU2 GEMPORT: [1~3] + ONUn GEMPORT: [1~3] |
| Home broadband Internet access | service b, slice b0 | slice b: uplink bandwidth 2 (3 Gbps) + ONU1 UNI2 + ONU2 UNI2 + ONUn UNI2 | T-CONT2~4: ONU1 GEMPORT: [2] + ONU2 GEMPORT: [4~6] + ONUn GEMPORT: [4~6] |
| AR/VR | service c, slice c0 | Slice c: uplink bandwidth 3 (3 Gbps) + ONU1 UNI3 + ONU2 UNI3 + ONUn UNI3 | T-CONT5~8: ONU1 GEMPORT: [3] + ONU2 GEMPORT: [7~9] + ONUn GEMPORT: [7~9] |

A configuration example for the downlink service is as shown in table 4.

TABLE 4

| service plan | service and end-to-end slice IDs | OAN slice (i.e., OLT + ONU slice division plan) | downlink TC layer |
|---|---|---|---|
| 5G speech | service a, slice a0 | slice a: downlink bandwidth 1 (1 Gbps) + ONU1 UNI1 + ONU2 UNI1 + ONUn UNI1 | ONU1 GEMPORT: [1] + ONU2 GEMPORT: [1~3] + ONUn GEMPORT: [1~3] |
| Home broadband Internet access | service b, slice b0 | slice b: downlink bandwidth 2 (3 Gbps) + ONU1 UNI2 + ONU2 UNI2 + ONUn UNI2 | ONU1 GEMPORT: [2] + ONU2 GEMPORT: [4~6] + ONUn GEMPORT: [4~6] |
| AR/VR | service c, slice c0 | slice c: downlink bandwidth 3 (3 Gbps) + ONU1 UNI3 + ONU2 UNI3 + ONUn UNI3 | ONU1 GEMPORT: [3] + ONU2 GEMPORT: [7~9] + ONUn GEMPORT: [7~9] |

After the configuration is finished, data forwarding is performed and data can enter a predetermined hard pipeline slot for forwarding guided with the configuration.

Basic uplink workflow on the forwarding plane is described below.

After a data packet encapsulated based on Ethernet PON XGEMPORT arrives at the OLT from the ONU, the data packet is decapsulated at the OLT and restored into an Ethernet service flow. Through EVC or service port description, the service flow can be distinguished on the forwarding plane with a VLAN TAG and, at an uplink interface board of the OLT OTN, the service flow is encapsulated through a generic framing protocol (GFP-F) and mapped to the ODU granularity. Mapping and correspondence relationships of the ODU granularity and the PON layer XGEMPORT are established from the configuration relationship.

The forwarding process may carry slice ID information in the end-to-end mapping process of encapsulation from the PON XGEMPORT to the OTN GFP-F, and information such as the slice ID is transmitted from a PON access layer to an OTN upper layer network through a configuration model.

The forwarding plane may not embody the slice ID at all, but complete data forwarding as guided by the management plane configuration.

Implementation examples of several key locations in the uplink direction within the system are provided below.

OLT PON service board:
  1) in PON port uplink, a correspondence relationship between slices and T-CONTs and mapping relationship between T-CONT IDs and XGEMPORT IDs of ONUs are distinguished through configuration;

2) in PON port uplink, DBA scheduling is performed on T-CONTs under a same slice according to the slice, the T-CONT controls a corresponding uplink slot at the PON TC layer with start time and end time, one PON port supports DBA of 8 uplink slices, the scheduling policies for DBA on different slices are independent of, and may be different from, each other; and PON uplink QOS merely desires to enhance DBA of slices, the DBA scheduling of different slices is completely independent, and for a service slice desiring low latency, a DBA scheduling mechanism different from that of a general home broadband can be adopted; and 3) a PON board restores the Ethernet service flow and distinguishes the Ethernet service flow with a service flow ID, for example, using a VLAN TAG on the forwarding plane to identify the flow.

Switching Matrix:

1) a slice forwarding plane is isolated; and
2) a PON board Ethernet service is switched and sent to an uplink board client layer, and the service flow is still distinguished with the VLAN TAG.

Uplink Board:

1) the Ethernet service flow is guided by the EVC and service port description, and the Ethernet service layer is encapsulated to a predetermined ODUk slot; and
2) slices are completely isolated by slots.

Basic downlink workflow on the forwarding plane is described below.

Mapping and correspondence relationships of the ODU granularity and the PON layer XGEMPORT are established from the configuration relationship. After being decapsulated through GFP-F from the OTN slot, the Ethernet service flow described by the EVC or service port is restored, the slice information is transferred from an OTN upper layer network to the OAN OLT device which establishes, according to a mapping relationship between the OAN slice and the downlink XGEMPORT, a downlink forwarding relationship to the ONU XGEMPORT.

Implementation examples of several key locations in the downlink direction within the system are provided below.

Uplink Board:

1) slices are completely isolated by slots;
2) the slot layer, at the client layer, decapsulates to the Ethernet service flow described by the EVC or service port, which can be identified on the forwarding plane with a VLAN TAG.

Switching Matrix:

1) a slice forwarding plane is isolated; and
2) the uplink board Ethernet service flow is switched and forwarded to a service PON board, and distinguished with the service flow ID, for example, a VLAN TAG.

PON Board:

1) the PON port downlink is isolated by bandwidth allocation (e.g., weighted fair queue (WFQ)); and
2) data streams between slices are isolated by XGEMPORT frame slots, and a slot header contains slice ID information.

Through a time-slotted process of the PON link layer, a slot length is designed to be constant, and the XGTC payload has a fixed length to facilitate the time-slotted process. The PON layer adds a time-slotted interface by changing the frame structure. The PON TC layer may be embodied in a manner similar to dividing a fixed-length slot granularity in the FlexE, dividing a fixed-length slicing field and implementing slicing in the PON. In the downlink, the "time-slotted frame structure and intra-slice scheduling" of hardware slices are desired to be enhanced, for example, by changing the frame structure and adding slice information.

In two technical choices for implementing hard pipeline slicing in a PON downlink TC layer, a scheme of a slice mapping table includes: adding slotmap information in PSBd and payload by modifying a PON standard GTC layer, and setting a correspondence relationship to static loads in the payload area; the other method involves dual GEM layer nesting, which has the advantage of merely adding a service layer mapping rule and partially modifying the service mapping part, without changing the standard GTC layer.

Specific Example II

This example provides a specific implementation of end-to-end slicing from an OAN device to an OTN device.

On the management plane, as shown in FIG. 2, the management system or controller has a full network service flow and slice view, and is capable of managing and configuring information of an OAN slice domain and an OTN slice domain and establishing information on slice mapping from the OAN slice to the OTN slice.

For example, the management system or controller performs scenario planning for the OAN slice domain, and classifies OAN slices for home PCs, telephones, TVs, and wireless base station access services, respectively, to implement service isolation. The management system or controller performs scenario planning for the OTN slice domain, and establishes OTN slices according to an upstream wired service provider and a wireless service provider of the network.

The configuration on the management plane performed by the management system or controller may include: configuring a mapping relationship of OAN service flow IDs, end-to-end slice IDs and OAN slice IDs, and embodying OAN slices in slots of a PON TC layer; configuring a mapping relationship of OTN service flow IDs, end-to-end slice IDs and OTN slice IDs, and embodying OTN slices in OTN slots; and splicing the OAN slices and the OTN slices through a service flow characteristic description ID.

On the forwarding plane, an Ethernet service flow, entering an OAN system through an ONU UNI which corresponds to the PON TC layer ID in the PON system, is transmitted to an OLT device after being encapsulated by the PON TC layer, and then decapsulated to restore the Ethernet service flow. The Ethernet service flow, entering a transmission uplink interface through a VLAN TAG and QOS flow control, is mapped to an ODUk granularity after rate matching and GFP-F encapsulation, and an ODUj granularity and an upstream OTN device implement data forwarding of hard pipeline slot isolation.

In this example, the mapping from the service flow to the PON TC layer slot and the ODUk granularity has been configured in advance on the management plane. The forwarding plane enters the corresponding slot according to a predetermined rule. After being restored through encapsulation/decapsulation by the PON TC layer slot, the Ethernet service flow enters the OTN slot for encapsulation/decapsulation, and splicing on the forwarding plane is performed through the restored Ethernet service flow. The OLT uplink location or interior of the OLT is a location where the slice splicing of the OAN slice domain and the OTN slice domain is implemented in this example.

Specific Example III

This example provides a method for implementing splicing configuration from an OAN slice domain to an OTN slice domain.

In this example, interface meaning of two UNIs of the EVC is extended such that: the UNI interface corresponding to the OAN slice domain is an Ethernet service flow ID (ETH Flow ID) and can be distinguished with the ETH Flow ID; and the UNI interface corresponding to the OTN slice domain is an OTN slot, and can be distinguished with an OTN slot ID, and each OTN slot may be regarded as a miniaturized UNI interface. Specifically, an ODUk granularity ID, an ODUj granularity ID, or an FlexE granularity ID may be included.

The advantage of using the MEF EVC as the service flow description is that the EVC may be bound with an EVC profile. The EVC profile may be used to define transmission characteristics of the service flow, including CIR, PIR, CBS, EBS, or other QOS parameters, or may further define bandwidth, protection level, packet loss rate requirements of the service flow, or any customized service flow-level feature description. In addition, the MEF EVC may be bound or configured with VLAN TAG, including a single-layer CVLAN or a dual-layer SVLAN+CVLAN, to facilitate the binding and identification of service flows to slices.

Specific Example IV

This example provides a method for encapsulating/decapsulating an Ethernet service flow in an OAN slice domain and on a forwarding plane transmitting the slice domain in an OLT device.

In the uplink direction, an OAN uplink service frame in a PON TC layer may be restored to an Ethernet service flow in the OAN slice domain, and then the Ethernet service flow is mapped to an ODU granularity through an EVC or service port after GFP-F encapsulation and rate matching.

In the downlink direction, the ODU is decapsulated to an Ethernet service flow described by the EVC or service port, and then the Ethernet service flow is transmitted to the ONU through an OAN downlink service frame in the PON TC layer and an XGEMPORT.

Specific Example V

In this example, ID information of an OAN slice may be embodied in an OAN slot or not; and ID information of an OTN slice may be embodied in an OTN slot or not.

The embodying method includes: embodying the slice ID information in a slot field header or an overhead part, to facilitate identification of the slice information on the forwarding plane.

The method for not embodying includes: configuring and establishing a mapping table of slots and slice information through a management plane of a management system or a controller, and transmitting a service flow in a corresponding slot according to the predetermined configuration.

Those of ordinary skill in the art will appreciate that all or some operations of the above described method, functional modules/units in the system and apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer-readable storage medium which may include a computer storage medium (or non-transitory medium) or a communication medium (or transitory medium). As is well known to those of ordinary skill in the art, the term computer storage medium includes volatile and nonvolatile, removable and non-removable medium implemented in any method or technology for storing information, such as computer-readable instructions, data structures, program modules or other data. A computer storage medium includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage devices, or may be any other medium used for storing the desired information and accessible by a computer. Moreover, it is well known to those ordinary skilled in the art that a communication medium typically includes a computer-readable instruction, a data structure, a program module, or other data in a modulated data signal, such as a carrier wave or other transport mechanism, and may include any information delivery medium.

The present disclosure has disclosed example embodiments, and although specific terms are employed, they are used and should be interpreted merely in a generic and descriptive sense, not for purposes of limitation. In some instances, as would be apparent to one skilled in the art, features, characteristics and/or elements described in connection with a particular embodiment may be used alone or in combination with features, characteristics and/or elements described in connection with another embodiment, unless expressly stated otherwise. It will, therefore, be understood by those skilled in the art that various changes in form and details may be made therein without departing from the scope of the present disclosure as set forth in the appended claims.

What is claimed is:

1. A configuration method, comprising:
   determining, according to optical access network (OAN) service types, information of at least one OAN slice for transmitting an OAN service flow of each OAN service type;
   determining, according to optical transmission network (OTN) service types, information of at least one OTN slice for transmitting an OTN service flow of each OTN service type; and
   establishing, according to a correspondence relationship of the OAN service types and the OTN service types, a mapping relationship between the at least one OAN slice and the at least one OTN slice to obtain information of at least one end-to-end slice,
   wherein each of the at least one end-to-end slice comprises a set of OAN slice and OTN slice having a mapping relationship,
   wherein determining, according to the OAN service types, information of the at least one OAN slice comprises:
   determining information of an OAN slot for transmitting each OAN service flow as information of each OAN slice,
   determining, according to the OTN service types, information of the at least one OTN slice comprises:
   determining information of an OTN slot for transmitting each OTN service flow as information of each OTN slice, and
   establishing, according to the correspondence relationship of the OAN service types and the OTN service types, the mapping relationship between the at least one OAN slice and the at least one OTN slice to obtain information of the at least one end-to-end slice comprises:

establishing, according to the correspondence relationship of the OAN service types and the OTN service types, a mapping relationship between the OAN slot for transmitting each OAN service flow and the OTN slot for transmitting each OTN service flow, to obtain information of the at least one end-to-end slice.

2. The configuration method according to claim 1, wherein establishing, according to the correspondence relationship of the OAN service types and the OTN service types, the mapping relationship between the OAN slot for transmitting each OAN service flow and the OTN slot for transmitting each OTN service flow, to obtain information of the at least one end-to-end slice comprises:

establishing an Ethernet virtual connection (EVC) between an OAN slot and an OTN slot having a mapping relationship, wherein the EVC corresponds to one end-to-end slice, information of a user network interface (UNI) in the EVC represents the OAN slot, and information of another UNI in the EVC represents the OTN slot.

3. The configuration method according to claim 1, wherein establishing, according to the correspondence relationship of the OAN service types and the OTN service types, the mapping relationship between the OAN slot for transmitting each OAN service flow and the OTN slot for transmitting each OTN service flow, to obtain information of the at least one end-to-end slice comprises:

establishing a service port between an OAN slot and an OTN slot having a mapping relationship, wherein the service port corresponds to one end-to-end slice, information of a UNI in the service port represents the OAN slot, and information of another UNI in the service port represents the OTN slot.

4. The configuration method according to claim 2, wherein establishing, according to the correspondence relationship of the OAN service types and the OTN service types, the mapping relationship between the OAN slot for transmitting each OAN service flow and the OTN slot for transmitting each OTN service flow, to obtain information of the at least one end-to-end slice further comprises:

configuring a virtual local area network tag for the OAN slot, and configuring a virtual local area network tag for the OTN slot, wherein a same virtual local area network tag is configured for the OAN slot and the OTN slot having a mapping relationship.

5. The configuration method according to claim 1, wherein in a downlink direction from OTN to OAN, determining information of the OAN slot for transmitting each OAN service flow as information of each OAN slice comprises:

determining a gigabit-capable passive optical network (GPON) encapsulation mode port (GEMPORT) ID of a GEMPORT bearing the OAN service flow transmitted in the OAN slot; and establishing a mapping relationship between the OAN slice for transmitting the OAN service flow and the GEMPORT ID of the GEMPORT bearing the OAN service flow, to obtain information of the OAN slice.

6. The configuration method according to claim 1, wherein in an uplink direction from OAN to OTN, determining information of the OAN slot for transmitting each OAN service flow as information of each OAN slice comprises:

determining a transmission container (T-CONT) bearing the GEMPORT; and establishing a mapping relationship between the T-CONT and an OAN slot corresponding to the OAN slice, to obtain information of the OAN slice.

7. A controller, comprising:

one or more processors; and a storage device having one or more programs stored thereon, wherein the one or more programs, when executed by the one or more processors, cause the one or more processors to implement the configuration method according to claim 1.

8. A non-transitory computer-readable storage medium having a computer program stored thereon which, when executed by a processor, causes the processor to implement the configuration method according to claim 1.

* * * * *